United States Patent [19]

Bergstrand

[11] Patent Number: 4,697,468
[45] Date of Patent: Oct. 6, 1987

[54] ROTARY MECHANISM
[75] Inventor: Gunnar Bergstrand, Huddinge, Sweden
[73] Assignee: Moveco System AB, Huddinge, Sweden
[21] Appl. No.: 822,414
[22] PCT Filed: Mar. 28, 1985
[86] PCT No.: PCT/SE85/00137
  § 371 Date: Nov. 15, 1985
  § 102(e) Date: Nov. 15, 1985
[87] PCT Pub. No.: WO85/04459
  PCT Pub. Date: Oct. 10, 1985

[30] Foreign Application Priority Data
Mar. 28, 1984 [SE] Sweden ................. 8401727

[51] Int. Cl.[4] ............................. F16H 21/44
[52] U.S. Cl. ............... 74/105; 74/99 R;
  74/108; 92/68; 92/140; 92/147
[58] Field of Search ........ 74/105, 106, 102, 104,
  74/99 R, 108; 92/140, 68, 76, 147

[56] References Cited

U.S. PATENT DOCUMENTS

| 1,170,254 | 2/1916 | Hendrickson | 92/140 |
|---|---|---|---|
| 3,044,313 | 7/1962 | Heckathorn | 74/108 |
| 3,119,310 | 1/1964 | Carlson | 92/68 |
| 3,150,489 | 9/1964 | Devvar | 92/147 X |
| 3,184,980 | 5/1965 | Schell | 74/102 |
| 3,198,086 | 8/1965 | Rager et al. | 92/68 X |
| 3,430,503 | 3/1969 | McLaughlin | 74/104 |
| 3,434,387 | 3/1969 | Ellis | 92/140 X |
| 3,448,626 | 6/1969 | Yeatman et al. | 74/108 |
| 3,482,879 | 12/1969 | Droste et al. | 74/108 |
| 3,696,684 | 10/1972 | Estlick | 74/104 |
| 3,818,808 | 6/1974 | Shafer | 92/147 X |
| 4,181,032 | 1/1980 | Wagner et al. | 74/99 R |
| 4,533,113 | 8/1985 | Francart, Jr. | 74/105 X |

FOREIGN PATENT DOCUMENTS

| 1292495 | 4/1969 | Fed. Rep. of Germany | 92/147 |
|---|---|---|---|
| 630207 | 11/1978 | U.S.S.R. | 74/108 |

Primary Examiner—Cornelius J. Husar
Assistant Examiner—Todd G. Williams

[57] ABSTRACT

A rotary mechanism for converting a reciprocal linear motion into an oscillating rotary motion with increased torque at the end positions. Two pressurized air cylinders 1,2 co-operate via links 14, 15 with a common lever arm 5 fastened to an output shaft. The cylinders provide an increased torque adjacent to each one of the end positions of the rotary motion.

7 Claims, 3 Drawing Figures

ROTARY MECHANISM

BACKGROUND OF THE INVENTION

The invention relates to a rotary mechanism for converting a reciprocal linear motion of an actuator, e.g. constituted by a piston-cylinder unit controlled by a pressurized fluid, into an oscillating rotary motion of an output shaft.

In known rotary mechanisms of this kind, e.g. operating with rack and gear means, a maximum torque is obtained between the end positions of the rotary motion, or a constant torque is developed during the entire stroke. However, such a characteristic is often disadvantegeous. In case, e.g., the rotary mechanism is to be used for operating a valve between open and closed positions, a maximum torque is needed especially in these end positions.

SUMMARY OF THE INVENTION

Thus, a primary object of the invention is to achieve a rotary mechanism which provides an increased torque at the end positions and which is generally useful, e.g. as an actuator or a transport device.

This object is achieved, according to the invention, by a rotary mechanism, the actuator of which comprises two co-operating, complementarily operating actuating units, each such unit being link-connected to a lever arm fastened to the output shaft, said two actuating units operating nonuniformly in speed while being mutually motion controlled via the shaft in such a way that the two actuating units deliver an increased torque adjacent to each one of the end positions of the rotary motion. These end positions may have a desired relative angular distance, which, e.g., may be 90° or 180° in standard applications.

These two acutating units, preferably in the form of pressurized fluid working cylinders, complement each other in such a way that one of the units provides an increased torque adjacent to one end position of the rotary motion (wherein the other unit contributes considerably less), whereas the other unit produces an increased torque adjacent to the other end position of the rotary motion. A considerably increased torque will be obtained if the linear movement direction of each actuating unit is approximately transversal to a link, coupled between the lever arm of the shaft and the actuating unit, in the particular end position. With such an arrangement, even a self-locking effect in the end positions is obtained, especially if the actuating units are linearly guided. If the stroke of the actuating unit is suitably dimensioned, an effective end position damping effect of the rotary motion can possibly be achieved, wherein the kinetic energy is absorbed by the link mechanism and adjoining guiding means.

According to the preferred embodiment, both actuating units are link-connected to a common lever arm, in particular a triangular lever arm, in which case the actuating units thus operate in the same plane as the motion plane of the lever arm, e.g., in parallel and adjacent to each other.

BRIEF DESCRIPTION OF THE DRAWINGS

Thus, the invention will be further explained below with reference to the appended drawing, which illustrates two embodiments.

DESCRIPTION OF THE PREFERRED EMBODIMENTS

Figure 1:
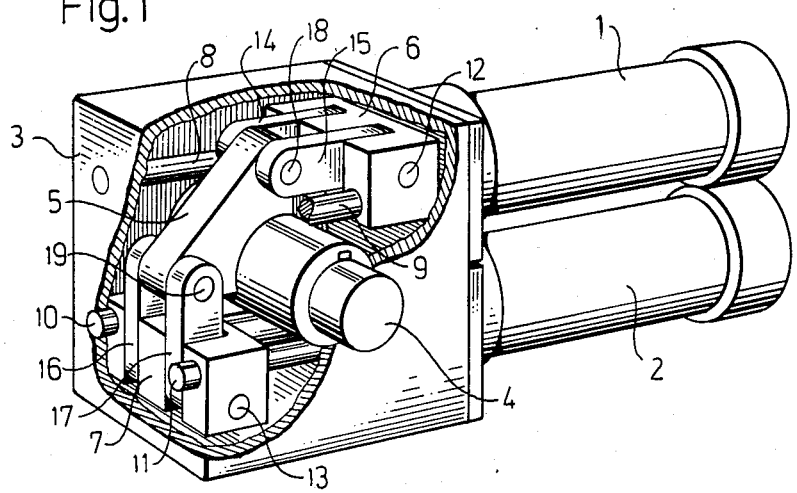
FIG. 1 shows schematically in perspective view a rotary mechanism according to the invention, wherein a portion of a surrounding casing in cut away for the purpose of illustration of the basic parts of the mechanism.
Figure 2:
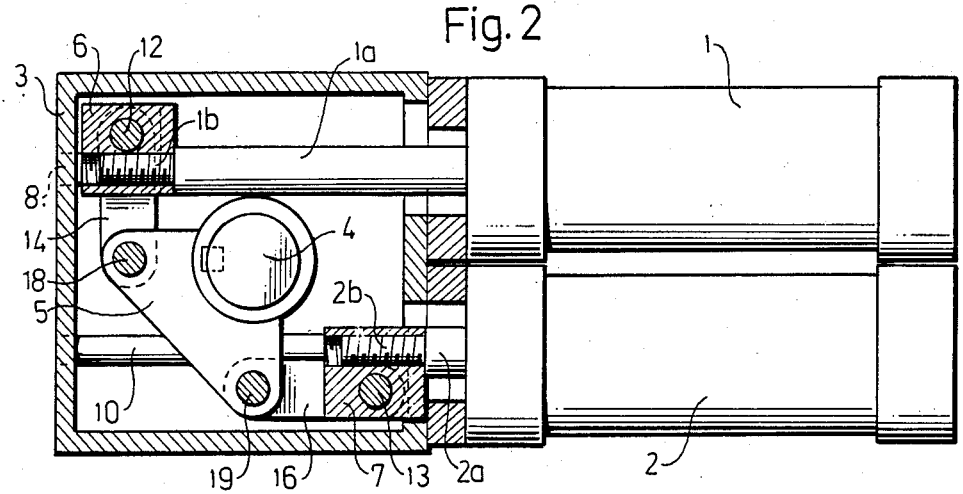
FIG. 2 shows the rotary mechanism according to FIG. 1 in side view, partly in longitudinal section.

The rotary mechanism shown in FIGS. 1 and 2 comprises essentially two pneumatic cylinders 1, 2 being arranged in parallel adjacent to each other and serving as actuating units, and a guiding and linking arrangement disposed in a casing 3, by means of which the linear motion of the pneumatic cylinders is transformed into a rotary motion of an output shaft 4.

According to the invention, the two pneumatic cylinders 1, 2 co-operate while being mutually motion controlled in that their piston rods 1a and 2a, respectively, are coupled via links to a common lever arm 5, which is permanently fastened to the output shaft 4, from which the desired rotary motion is obtained. Both cylinders 1, 2 are provided with pressurized air connections (not shown) as well as a piston (hidden in the figures), which is actuated by pressurized air and to which the piston rod 1a and 2a, respectively, is connected. The end 1b, 2b of each piston rod is attached, in shown example by screwing, to the central part of a yoke 6 and 7, respectively, which is oriented transversally relative to the respective piston rod and guided at both sides by means of guide in the form of steel rods 8, 9 and 10, 11, respectively, fixed to the casing, the steel rods fitting into corresponding through holes in the yoke. Hereby, it is secured that the piston rods 1a, 1b will operate exactly linearly, even under the influence of great transversal forces caused by the link arrangement.

Each yoke 6, 7 has a through-going bolt 12 and 13, respectively, serving as a pivot pin for a pair of links 14, 15 and 16, 17, respectively, disposed symmetrically relative to the common motion plane (the sectional plane to the left in FIG. 2), these links being fitted with play into corresponding recesses in each yoke and, with their opposite ends, being pivotably connected to the common lever arm 5 by means of a pivot pin 18 and 19, respectively.

The device described above operates in the following manner: Starting from the position shown in FIG. 2, the left cylinder chamber of the cylinder 1 and the right cylinder chamber of the cylinder 2 are pressurized, whereby the cylinder 1 pulls the piston rod 1a to the right and the cylinder 2 pushes the piston rod 2a to the left. These linear movements are mutually controlled by means of the linking arrangement 14,15, 5,16,17. In the beginning, the piston rod 1a is pushed rather fast to the right, causing the pair of links 14,15 to pivot clock-wise and, owing to the linear guides 8,9 to exert an upwardly directed force on the pivot pin 18. This force is rather great and provides a corresponding great torque on the output shaft. At the same time, the piston rod 2a moves rather slowly and contributes considerably less to the torque output. The total torque is, however, very great adjacent to this end position, which can be explained by the fact that the link pair 14,15 is oriented at right angle to the piston rod 1a and to the rectilinear guides 8,9 so as to provide a manifold force amplification. During continued movement the speed of the piston rod 1a will decrease, as will the the contribution of the cylinder 1 to the total torque on the shaft 4, whereas the speed of the piston rod 2a and its contribution to the torque will increase. In the other end position shown in FIG. 1, i.e. upon a rotary movement of 90° of the shaft 4, reverse conditions prevail, i.e. the cylinder 2 provides the major part of the torque, whereas the contribution of the cylinder 1 is practically negligible. All in all, the torque will be substantially increased in each end position of the rotary motion, and the torque is minimal half way between the end positions (where each cylinder provides as great a contribution). As mentioned above, such a characteristic is advantageous when the rotary mechanism serves as an actuating device so as to provide a rotary motion which in each end position requires a particularly great torque for overcoming friction and/or mass inertia.

It will be understood that the illustrated mechanism is self-locking in the end positions. Thus, if a torque is exerted on the shaft 4 in the position shown in FIG. 2, the pair of links 14,15 will be subjected to a force transversally to the rectilinear guides 8,9, which force has no component in the direction of the piston rod 1a and, consequently, will not cause any movement. In certain cases it is desired to dampen the movement at the end of a stroke. Such damping can be achieved by means of the guiding and linking mechanism itself, namely if the stroke of the cylinder pistons is somewhat longer than the stroke defined by the end postions of the linking mechanism shown in FIGS. 1 and 2. Thus, the necessary damping energy will be absorbed by the links and the guides in the casing 3, whereas the cylinders can be dimensioned rather small even for this reason (apart from the fact that the desired torque increase will be obtained by way of the design of the link mechanism). The whole device can therefore be made small and compact, i.e. with minor cylinders and a sturdy but non-voluminous guiding and linking arrangement.

Figure 3:
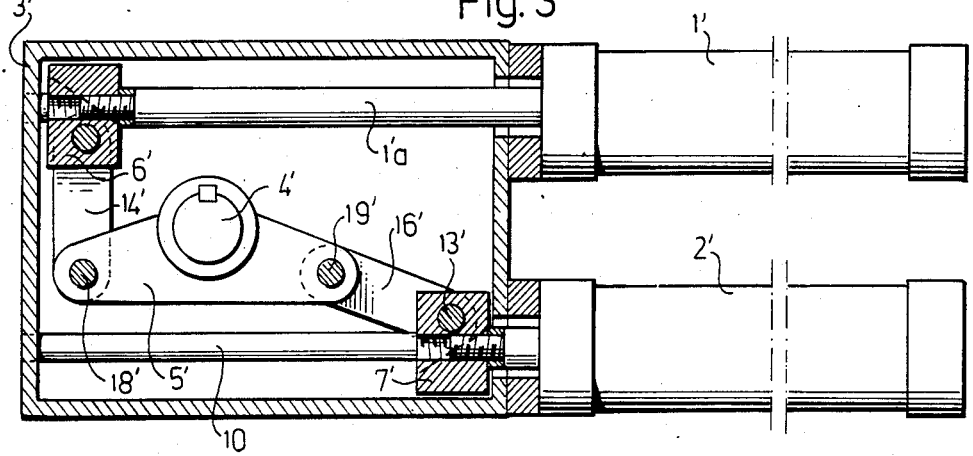
FIG. 3 shows, in a view corresponding to FIG. 2, another embodiment of the rotary mechanism according to the invention.

In FIG. 3, there is shown a rotary mechanism similar to that of FIGS. 1 and 2, the major difference being such a dimensioning of the various parts that the rotary motion is effected between end positions located at an angular distance of 180°. Corresponding parts are given the same reference numerals, though provided with prime characters. In this case, the difference between the contributions of the two cylinders 1',2' to the torque of the shaft 4' at the end positions is even greater than that of the previous embodiment, since the momentarily "weaker" cylinder (2' in FIG. 3) has its adjoining link 16' oriented radially towards the center axis of the shaft 4'.

It should be noted that several modifications can be made by the skilled man within the scope of claim 1. By adjusting the transversal distance between the cylinders and the relative lengths of the various links as well as the angular distance between the pivot pins 18,19 relative to the shaft 4, any desired angular distance between the end positions of the rotary motion can be obtained, namely between 0° and 180°. Furthermore, the cylinders can operate in different planes and each be coupled to a separate lever arm on the shaft. Nor need they be arranged in parallel to each other, but may be located mutually at an angle (though in movement planes transversal to the shaft 5). Moreover, it is preferred to make the rotary mechanism in certain standard sizes with a possibility to connect several units in parallel to a common rotary shaft.

In principle, the pressurized air cylinders may be replaced by other linearly operating actuators, such as linear induction motors or the like.

The important feature is that the two actuating units co-operate complementarily while being mutually controlled in such a way that a torque characteristic with increased end position values is obtained.

I claim:

1. A rotary mechanism for converting a reciprocal linear motion of an actuating device into an oscillating rotation of an output shaft between two angular end positions, comprising:

a casing;

first and second cooperating, complementarily operating actuating units mounted on said casing, said first and second actuating units including first and second movable piston rods respectively which extend into said casing and means for reciprocating said piston rods linearly within said casing;

a plurality of elongate piston guide rods each attached at each end thereof to said casing, said plurality of guide rods including first and second guide rods located adjacent to said first piston rod and third and fourth elongate piston guide rods located adjacent to said second piston rod.

attaching means attaching an end of said piston rods to said guide rods, said attaching means including first and second yokes each having a central portion and end portions, said first yoke end portions being slidingly mounted on said first and second guide rods respectively and said second yoke end portions being slidingly mounted on said third and fourth guide rods respectively, said end of each said piston rod being fixedly connected to a respective one of said yoke central portions;

a plurality of links pivotally connected to said yoke central portions and including a first pair of links connected to said first yoke and a second pair of links connected to said second yoke, said piston guide rods constraining said yokes to rectlinear reciprocal movement axially of said piston guide rods;

a triangular lever having a first apex pivotally attached to said first pair of links, a second apex pivotally attached to said second pair of links, said triangular lever being attached to the output shaft, said guide rods being transverse to the output shaft;

said actuating units being controlled so that said pistons operate non-uniformly in linear speed and said links and lever being arranged and sized so that such non-uniform linear speed is delivered to the output shaft in a manner which causes torque to be delivered in a manner which increases adjacent to each of the two angular end positions of the output shaft oscillating rotation motion.

2. The rotary mechanism defined in claim 1 wherein said first and second yokes are one-piece, monolithic elements.

3. A rotary mechanism as defined in claim 1, wherein said actuating units (1,2) are arranged in parallel to each other.

4. A rotary mechanism as defined in claim 1, wherein each of said actuating units is constituted by a piston-cylinder unit operating with pressurized fluid.

5. A rotary mechanism as defined in claim 1, wherein said guide rods are parallel.

6. A rotary mechanism as defined in claim 1, wherein said links are parallel flat links located on each side of the respective piston rod.

7. A rotary mechanism as defined in claim 6, wherein said flat links are connected to said yokes by means of a transversal bolt serving as a pivot pin.

* * * * *